D. W. MANNHARDT.
VALVE CAP.
APPLICATION FILED OCT. 13, 1919.
1,349,522. Patented Aug. 10, 1920.
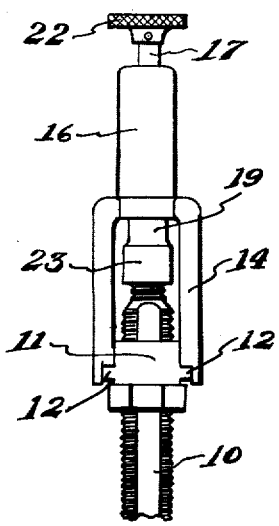
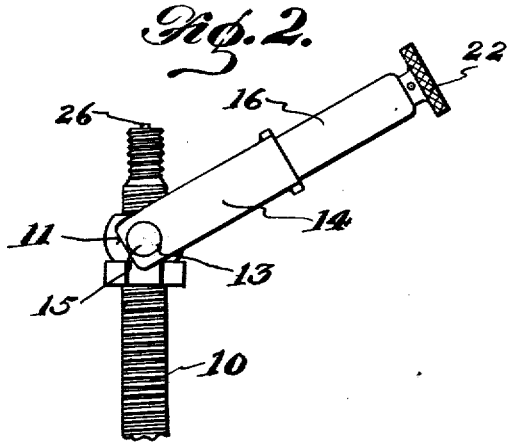
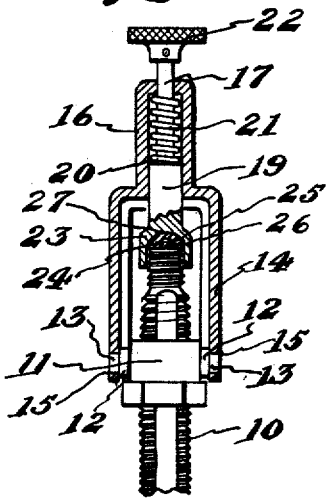
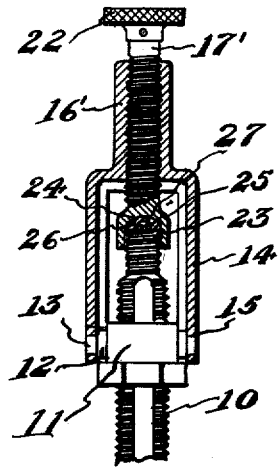
Inventor
D. W. Mannhardt
By Victor J. Evans
Attorney
Witnesses

UNITED STATES PATENT OFFICE.

DANIEL W. MANNHARDT, OF WASHINGTON, IOWA.

VALVE-CAP.

1,349,522.

Specification of Letters Patent. Patented Aug. 10, 1920.

Application filed October 13, 1919. Serial No. 330,175.

*To all whom it may concern:*

Be it known that I, DANIEL W. MANNHARDT, a citizen of the United States, residing at Washington, in the county of Washington and State of Iowa, have invented new and useful Improvements in Valve-Caps, of which the following is a specification.

This invention relates to attachments for valves and is especially designed for use in connection with valves for pneumatic tires.

An object of the invention is the provision of a cap for valves of pneumatic tires, which will effectually prevent the entrance of dust, or other foreign matter likely to interfere with the proper operation of the valve, and which may be secured in a manner to prevent its loss.

Another object is the provision of a cap of this character, by means of which the valve may be quickly uncovered for the purpose of inflating the tire and quickly replaced after inflation, the attachment serving to eliminate the use of the sleeve usually employed for inclosing the valve casing.

Other objects and advantages of the invention will appear as the following description is read in connection with the accompanying drawings.

In the drawings:

Figure 1 is a front elevation of the invention secured to the valve of a pneumatic tire.

Fig. 2 is a side elevation of the same showing the valve uncovered and the device swung upon its pivot to permit of the inflation of the tire.

Fig. 3 is a longitudinal sectional view with the parts in the position shown in Fig. 1.

Fig. 4 is a similar view showing a modified form of the invention.

Referring to the drawings in detail, wherein like characters of reference denote corresponding parts, there is illustrated at 10 the casing of a valve usually employed for inflating inner tubes of pneumatic tires. This casing is exteriorly threaded for the reception of the usual dust cap and protecting sleeve, but it is the purpose of this invention to do away with the use of this cap and sleeve. For this purpose there is provided a nut 11, which is mounted upon the exterior of the casing 10, and is provided with lugs 12, which terminate in pintles 13.

Pivotally mounted upon the pintles 13, is a yoke 14, the yoke 14 having perforations 15 in each end thereof to receive the pintles. The yoke is preferably U-shaped in cross section to strengthen the same, and is provided with a projecting sleeve 16.

Mounted for sliding movement in the sleeve 16, is a rod 17, the said rod having a bearing in an opening 18, provided in one end of the sleeve and having its inner end enlarged, as at 19, to form a bearing for the inner end of the rod and to provide a shoulder 20. Positioned between this shoulder and the outer end of the sleeve 18, is a coiled spring 21 the latter surrounding the rod 17 and acting to normally force the inner end of the rod toward the pivoted end of the yoke. The outer end of the rod is provided with a head 22 for convenience of operation. The inner end of the rod 17 is socketed, so as to provide a cap 23, the latter being designed to engage over the reduced end of the valve casing 10. Seated within the cap 23, is a gasket 24, which engages the upper edge of the valve casing, and is provided with an opening 25, to permit of the passage of the valve stem 26 into a socket 27, formed in the rod 17. This permits of the application of the cap without releasing the air from the tire.

In Fig. 4 there is illustrated a form of the invention in which the rod 17' is threaded within the sleeve 16', so that the said rod may be screwed inward to engage the cap over the end of the valve.

The invention is susceptible of various changes in its form, proportions and minor details of construction and the right is herein reserved to make such changes as properly fall within the scope of the appended claim.

Having described the invention, what is claimed is:

The combination with a valve casing, of a nut threadedly engaged on the casing, a yoke having its ends pivotally secured to the nut, a sleeve extending from the yoke, a plunger slidable in the sleeve, a reduced shank extending from the plunger and projected through a restricted opening in the opposite end of the sleeve, the space surrounding the reduced shank defining a chamber whose end walls are formed by the upper end of the sleeve and a shoulder formed at the juncture of the plunger and its reduced shank, a cap carried by the lower end of the plunger for engagement over the end of the valve casing, and a spring located within the chamber to yieldingly hold the cap in such engagement.

In testimony whereof I affix my signature.

DANIEL W. MANNHARDT.